US012724717B2

(12) United States Patent
Chang et al.

(10) Patent No.: US 12,724,717 B2
(45) Date of Patent: Sep. 1, 2026

(54) STORAGE DEVICE, STORAGE SYSTEM AND OPERATING METHOD OF THE SAME USING MEMORY BUFFER

(71) Applicant: Samsung Electronics Co., Ltd., Suwon-si (KR)

(72) Inventors: Ji Won Chang, Suwon-si (KR); Seon Bong Kim, Suwon-si (KR); Young Suk Moon, Suwon-si (KR); Sang Muk Hwang, Suwon-si (KR); Seung Won Lee, Suwon-si (KR); Kwang Hee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/903,418

(22) Filed: Oct. 1, 2024

(65) Prior Publication Data

US 2025/0284645 A1 Sep. 11, 2025

(30) Foreign Application Priority Data

Mar. 5, 2024 (KR) ........................ 10-2024-0031555

(51) Int. Cl.
*G06F 12/10* (2016.01)
*G06F 12/0871* (2016.01)
*G06F 12/1027* (2016.01)
*G06F 13/16* (2006.01)

(52) U.S. Cl.
CPC ...... *G06F 12/1027* (2013.01); *G06F 12/0871* (2013.01); *G06F 13/1673* (2013.01)

(58) Field of Classification Search
CPC ............. G06F 12/1027; G06F 12/0871; G06F 13/1673; G06F 2212/7203; G06F 12/0246; G06F 2212/7201; G06F 3/0658; G06F 12/1081
USPC .......................................................... 711/202
See application file for complete search history.

(56) References Cited

U.S. PATENT DOCUMENTS

| | | | |
|---|---|---|---|
| 10,929,310 B2 | 2/2021 | Borikar et al. | |
| 10,977,187 B2 * | 4/2021 | Lee | G06F 12/1009 |
| 11,126,554 B2 | 9/2021 | Vakharwala et al. | |
| 11,157,319 B2 | 10/2021 | Dubeyko et al. | |
| 2021/0019069 A1 | 1/2021 | Sen et al. | |
| 2022/0334991 A1 | 10/2022 | Narayanan et al. | |
| 2023/0214329 A1 | 7/2023 | Woo et al. | |

(Continued)

FOREIGN PATENT DOCUMENTS

KR 10-2023-0105441 A 7/2023

*Primary Examiner* — Hua J Song
(74) *Attorney, Agent, or Firm* — MORGAN, LEWIS & BOCKIUS LLP

(57) ABSTRACT

A storage device, a storage system and an operating method of the storage device are provided. The storage device connected to a host comprises a storage controller including an address translation cache that translates a virtual address received with a command from the host into a physical address, wherein the storage controller stores index information on a host specific memory buffer (SMB) in the host in advance, performs direct memory access to the virtual address for the host SMB when a cache miss occurs in the address translation cache, and transmits an exceptional completion queue (CQ) including an indicator to the host when the direct memory access is completely performed.

18 Claims, 11 Drawing Sheets

(56) References Cited

U.S. PATENT DOCUMENTS

| | | | | |
|---|---|---|---|---|
| 2023/0266917 | A1* | 8/2023 | Choe .................. | G06F 12/0879 |
| 2025/0077453 | A1* | 3/2025 | Segev .................... | G06F 13/28 |

* cited by examiner

Figure 1:
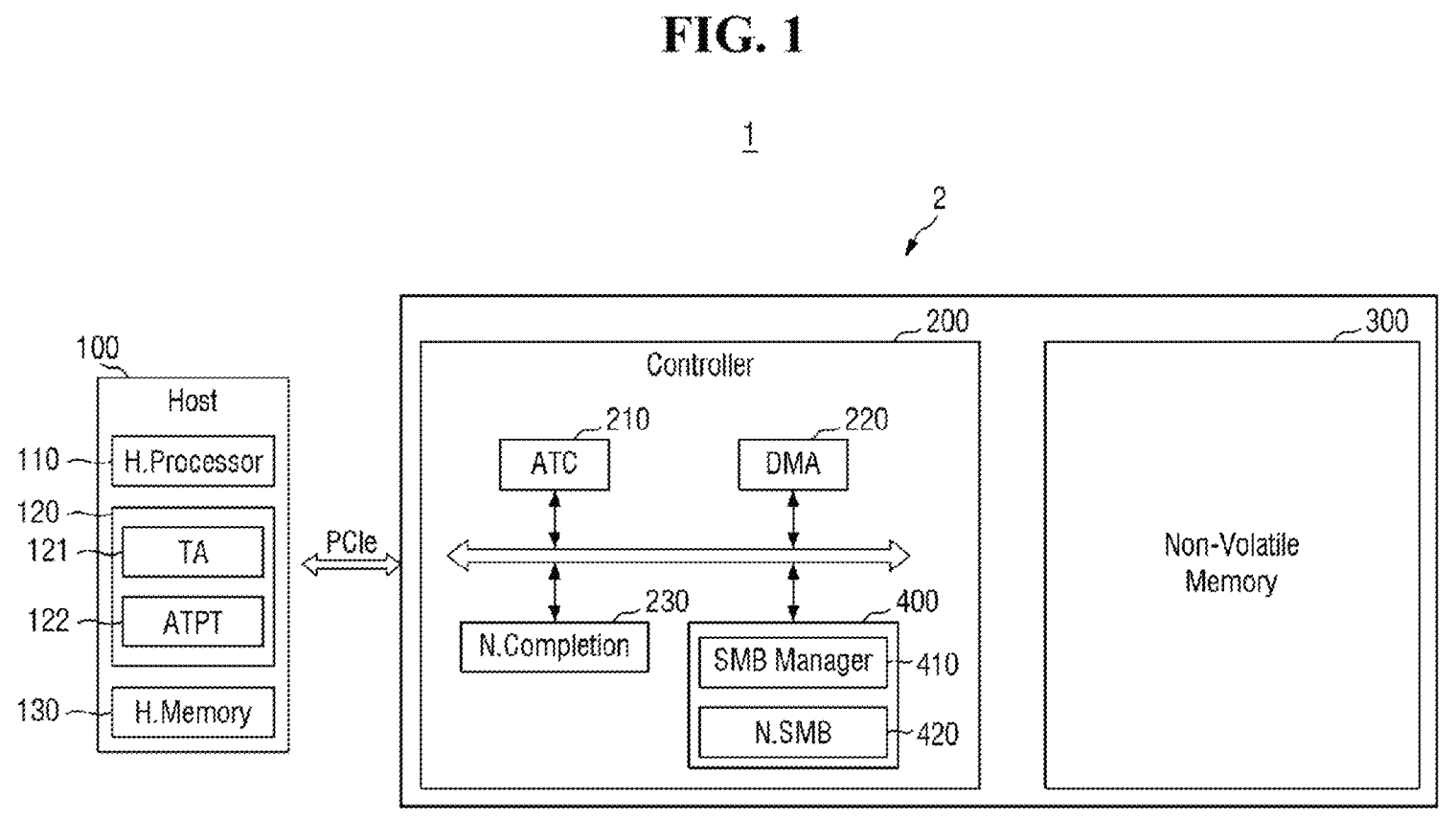

Host
H.Processor
TA
ATPT
H.Memory
100
110
120
121
122
130

PCIe

Controller
ATC
DMA
N.Completion
SMB Manager
N.SMB
200
210
220
230
400
410
420

Non-Volatile Memory
300

| Physical Address | Block Size | Index number |
|---|---|---|
| Mapped PA 0 | PA 0 Size | Index 0 |
| Mapped PA 1 | PA 1 Size | Index 1 |
| Mapped PA 2 | PA 2 Size | Index 2 |
| Mapped PA 3 | PA 3 Size | Index 3 |
| ... | ... | ... |

STORAGE DEVICE, STORAGE SYSTEM AND OPERATING METHOD OF THE SAME USING MEMORY BUFFER

CROSS-REFERENCE TO RELATED APPLICATION

This application claims priority from Korean Patent Application No. 10-2024-003155 filed on Mar. 5, 2024, in the Korean Intellectual Property Office and all the benefits accruing therefrom under 35 U.S.C. 119, the contents of which in its entirety are herein incorporated by reference.

BACKGROUND

Technical Field

The present disclosure relates to a storage device.

Description of the Related Art

A storage system may provide address translation for direct memory access (DMA) from input/output devices (e.g., network adapters, graphic process units (GPUs), storage controllers, and the like) to a main memory of the storage system. The storage system may include an input/output memory management unit (IOMMU) for protecting a memory from an error operation due to a limited size of the main memory that may be accessed by the input/output devices.

The storage system may include an input/output translation lookaside buffer (IOTLB) to improve performance of the input/output memory management unit. The input/output translation lookaside buffer may be used as a cache for increasing an address verification speed. However, a cache miss of the input/output translation lookaside buffer may be a relatively greater factor in performance degradation of the storage system than an untranslated addressing system.

To mitigate the cache miss of the input/output translation lookaside buffer, the storage system may include a device-side input/output translation lookaside buffer (or referred to as a translation lookaside buffer (TLB) or an address translation cache (ATC); referred to as ATC for differentiation from a host side) in a device-side (e.g., host interface in a storage device) thereof. The ATC may support address translation services (ATS) defined by Peripheral Component Inter-connect-Special Interest Group (PCI-SIG®) and/or Peripheral Component Interconnect Express (PCIe®).

As the device-side of the storage system performs the address translation service, the ATC may be in charge of at least a portion of address processing processed by a central processing unit (CPU) and/or the IOMMU, and may increase the overall size of the input/output translation lookaside buffer to a size of a sum of the input/output translation lookaside buffer and the ATC.

Since an access size (e.g., minimum data size to be read) to a non-volatile memory device in the storage system and an access size of a memory in the host system are different from each other, performance of the storage system may be improved when data is read based on the non-volatile memory device.

However, when data is read based on the non-volatile memory device, the number of virtual addresses to be translated by the ATC may be increased, and thus an address translation cache miss rate (ATC miss rate) may be increased. Due to the limited size of the ATC, the storage system may suffer performance degradation caused by ATC Miss, and ATC update latency performed during the ATC Miss becomes variable depending on the configuration of the storage system, making it difficult to predict.

BRIEF SUMMARY

According to an aspect of the present disclosure, there is provided a storage device comprises a storage controller including an address translation cache that translates a virtual address received with a command from a host into a physical address, wherein the storage controller stores index information on a host specific memory buffer (SMB) in the host in advance, performs direct memory access to the virtual address for the host SMB when a cache miss occurs in the address translation cache, and transmits an exceptional completion queue (CQ) including an indicator to the host when the direct memory access is completely performed.

According to another aspect of the present disclosure, there is provided a storage system comprises a host including a host memory storing index information on a physical address and a host processor outputting a command and a virtual address, and a storage device sharing the index information in advance and transmitting data according to the command to the host memory together with an indicator according to the index information in accordance with a direct memory access operation.

According to another aspect of the present disclosure, there is provided a method for operating a storage device, comprises performing direct memory access to a host together with a virtual address when a cache miss for the virtual address occurs in an address translation cache, and outputs a completion queue, which includes an indicator corresponding to the virtual address, to the host.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a block diagram illustrating a storage system according to some embodiments;

FIG. 3 is a table illustrating index information shared in advance by a storage device and a host in accordance with some embodiments;

DETAILED DESCRIPTION OF THE DISCLOSURE

Figure 2:
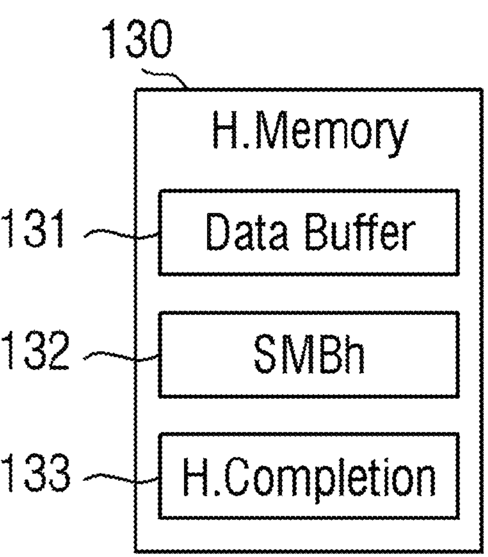
FIG. 2 is a block diagram illustrating a host memory according to some embodiments.

FIG. 1 is a block diagram illustrating a storage system according to some embodiments, and FIG. 2 is a block diagram illustrating a host memory according to some embodiments. FIG. 3 is a table illustrating index information shared in advance by a storage device and a host in accordance with some embodiments.

Referring to FIGS. 1 to 3, a storage system according to some embodiments may be, for example, a mobile system such as a mobile phone, a smart phone, a tablet personal computer (PC), a wearable device, a healthcare device or an Internet of things (IoT) device. However, a storage system 1 of FIG. 1 is not necessarily limited to a mobile system, but may be a personal computer, a laptop computer, a server, a media player or an automotive device such as a navigator.

Subsequently, referring to FIG. 1, the storage system 1 according to some embodiments includes a host 100 and a storage device 2.

The host 100 includes a host controller 110 (also referred to herein as host processor), a host memory 130 and an input/output memory management unit (IOMMU) 120. The IOMMU 120 includes, for example, a translation agent (TA) 121, and an address translation and protection table (ATPT) 122.

The host controller 110 may manage an operation of storing data (e.g., recorded data) of a data buffer 131 in the host memory 130 in the storage device 2 or storing data (e.g., read data) of the storage device 2 in the data buffer 131.

The translation agent 121 may include hardware, firmware and/or software that translates an address in a PCIe transaction into a physical address associated therewith. For example, when receiving an address translation service request from the storage device 2, the translation agent 121 allocates a new physical address to a virtual address included in the address translation service request and replies the allocated physical address to the storage device 2200. The physical address may be a location in the host memory 130.

The address translation and protection table 122 may store address translation information processed by the translation agent 121 to process PCIe requests such as direct memory access (DMA) read or direct memory access write among address translation services (ATS).

The host memory 130 may be an embedded memory provided in the host 100, or may be a non-volatile memory or a memory module, which is disposed outside the host 100. The host memory 130 may include, for example, a data buffer 131, a host specific memory buffer (SMB) 132 and a host completion manager 133.

The data buffer 131 may serve as a buffer memory for temporarily storing data to be transmitted to the storage device 2 or data transmitted from the storage device 2.

The host SMB 132 stores index information, and also stores data requested for direct memory access only with a virtual address without a physical address from the storage device 2. The host completion manager 133 receives and stores a normal completion queue having no indicator or an exceptional completion queue including an indicator from the storage device 2. The host completion manager 133 checks (or extracts) the indicator from the exceptional completion queue.

The translation agent 121 maps the virtual address received together with the direct memory access request to a physical address of an index corresponding to the checked indicator and stores address translation information between the virtual address and the mapped physical address in the ATPT 122.

According to one embodiment, the host controller 110 and the host memory 130 may be implemented as separate semiconductor chips. Alternatively, in some embodiments, the host controller 110 and the host memory 130 may be integrated into the same semiconductor chip. As an example, the host controller 110 may be any one of a plurality of modules provided in an application processor, and the application processor may be implemented as a system on chip (SoC).

The storage device 2 may further include a storage controller 200 and a non-volatile memory 300. The storage controller 200 may control data writing and reading operations for the non-volatile memory by executing a flash translation layer.

The storage controller 200 may include an address translation cache (ATC) 210, a direct memory access manager 220, a device completion manager (also referred to herein as NVMe completion manager) 230 and a storage memory buffer (SMB) 400.

The address translation cache 210 is a cache for increasing an address verification speed, and stores a physical address of the host memory 130, which corresponds to a virtual address received together with a command by the host processor. The address translation cache 210 may support address translation services (ATS) defined by a peripheral component inter-connect-special interest group (PCI-SIG®) and/or a peripheral component interconnect express (PCIe®). When there is no information on a physical address corresponding to a virtual address in the address translation cache 210 (Cache Miss), the storage controller 200 transmits an address translation service request (ATS request) to the host 100. The address translation service request (ATS Req) may be associated with one or more address translation cache entry replacement policies (e.g., user definition, QoS, rate limit or workload-based policy). Alternatively, the address translation service request (ATS Req) may be associated with an address translation cache (ATC) replacement algorithm (e.g., Deficit Weighted Round Robin (DWRR).

The host 100 may transmit an address translation service response (ATS Resp) to the address translation service request (ATS Req) to the storage device 2. The address translation service response (ATS Resp) may be a completion response to a request from the storage device 2, or may be a cache miss response that physical address information requested by the storage device 2 does not exist.

The direct memory access manager 220 is coupled to an internal communication bus of the storage device 2, and transfers data between the host 100 and the non-volatile memory 300. The direct memory access manager 220 may perform a write operation by allowing data received from the data buffer 131 of the host 100 to directly access the non-volatile memory 300, or may transmit data read from the non-volatile memory 300 to the data buffer 131 of the host 100 or the host SMB 132 by direct memory access.

The storage memory buffer (SMB) 400 may include an SMB manager 410 and a device SMB 420. When a cache miss occurs in the address translation cache 210, the SMB manager 410 requests the direct memory access manager 220 of memory access to the virtual address. In addition, the SMB manager 410 selects any one indicator from index information stored in advance with respect to the virtual address for which the direct memory access is requested and transmits the index information to the device completion manager 230 together with the selected indicator to perform a completion notification. For example, the index information may be stored in the device SMB (N.SMB) 420 in advance. The device SMB (N.SMB) 420 may be implemented as, for example, a static random access memory.

When the direct memory access manager 220 completely performs the direct memory access, the device completion manager (N.Completion) 230 transmits a completion queue (CQ) to the host completion manager 133. The completion queue may be, for example, an exceptional completion queue including an indicator, or may be a normal completion queue having no indicator. When the device completion manager 230 receives a completion notification together with the selected indicator from the SMB manager 410, the device completion manager 230 transmits the exceptional completion queue to the host completion manager 133. However, when the direct memory access manager 220 performs the direct memory access with the physical address, the device completion manager 230 transmits the normal completion queue to the host completion manager 133.

The storage device 2 may include storage media for storing data in accordance with a request from the host 100. The storage device 2 may be a device that complies with the non-volatile memory express (NVMe) standard. The host 100 and the storage device 2 may generate and transmit packets according to standard protocols, which are employed, respectively.

The storage device 2 may include a non-volatile memory 300. When the non-volatile memory includes a flash memory, the flash memory may include a two-dimensional NAND memory array or a three-dimensional (or vertical) NAND memory array. As another example, the storage device 2 may include various other types of non-volatile memories 300. For example, the storage device 2 may include a magnetic RAM (MRAM), a spin-transfer torque MRAM, a conductive bridging RAM (CBRAM), a Ferroelectric RAM (FeRAM), a phase RAM (PRAM), a resistive RAM and other various types of memories.

Referring to FIG. 3, the host 100 and the storage device 2 may share index information in advance before an access operation. For example, when the system is booted, the storage device 2 may receive and store the index information from the host 100 and then perform an access operation according to a command from the host 100.

The index information is information on the host memory 130, and includes information on a storage location in the host SMB 132. The index information may include, for example, a physical address, a block size, and an index number corresponding to an indicator.

For example, when the storage device 2 performs direct memory access to the host memory 130 only with a virtual address without a physical address, the host 100 controls the storage device 2 to perform the direct memory access to the host SMB 132. In this case, the host checks the indicator included in the completion queue, and processes the corresponding direct memory access from the physical address in the host SMB 132 of the index corresponding to the indicator.

Figure 4:
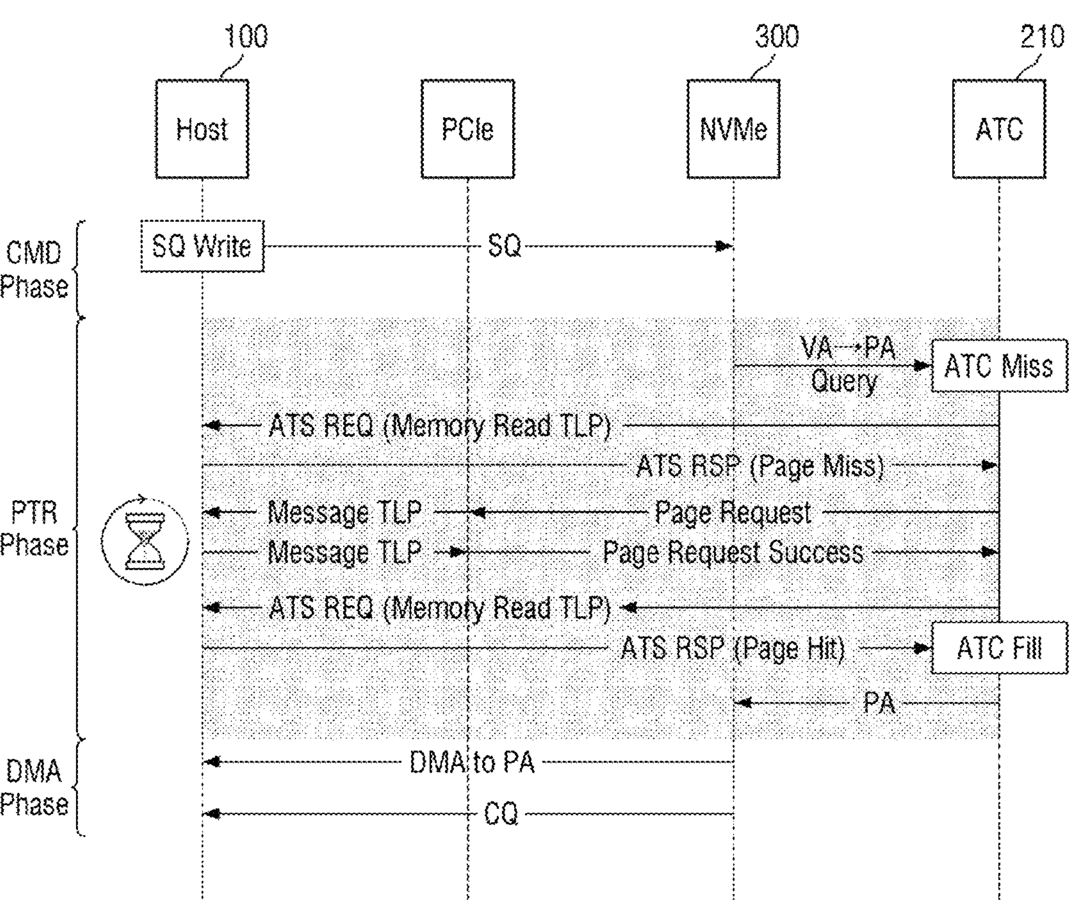
FIG. 4 is a flow chart illustrating an operating method of a storage system.

FIG. 4 is a flow chart illustrating an operating method of a storage system.

Referring to FIG. 4, the host 100 transmits a data write command SQ to the storage controller 200 in a command (CMD) phase. The data write command SQ may be, for example, transferring a command (e.g., a write command) through a submission queue when the host 100 transfers a signal to the storage device 2.

When receiving a data write command, the storage device 2 translates a virtual address included in the data write command SQ into a physical address in an address translation (PTR) phase. In more detail, the storage controller 200 requests whether there is physical address information corresponding to the virtual address received in the address translation cache 210 (VA-PA Query), and when a cache miss occurs in the address translation cache 210 (ATC Miss), the address translation cache 210 transmits an address translation service request (ATS REQ) including the cache missed virtual address to the translation agent 121 of the host 100.

The translation agent 121 checks the physical address mapped to the received virtual address, and replies the address translation service response (ATS RSP) to the address translation cache 210 through the storage controller 200 when there is no mapped physical address in the ATPT 122. The address translation cache 210 transmits a page request for requesting allocation of a new physical address, that is, a page, to the virtual address, to the translation agent 121, and the translation agent 121 allocates a new page based on the ATPT 122 and then performs a page request success response. Afterwards, the address translation cache 210 retransmits the address translation service request (ATS REQ), which includes the cache missed virtual address, to the translation agent 121 of the host 100, and the translation agent 121 performs the address translation service response (ATS RSP, Page Hit) that includes a physical address of the newly allocated page. The storage controller 200 extracts the newly received physical address from the address translation service response and transfers the extracted physical address to the address translation cache 210. The address translation cache 210 updates the newly received physical address with information on the corresponding virtual address (ATC Fill), and transmits the updated physical address to the direct memory access manager 220.

In the direct memory access phase (DMA phase), the direct memory access manager 220 performs direct memory access to the host memory 130 of the updated physical address (DMA to PA). Subsequently, the device completion manager 230 transmits the completion queue CQ to the host 100.

When the operation in the address translation phase continues to be repeated as shown in FIG. 4 whenever a cache miss occurs in the address translation cache 210, latency is increased during the operation, which may lead to performance degradation of the storage system 1.

To solve this problem, performance degradation of the storage system 1 may be mitigated when the latency in the address translation phase is reduced even though a cache miss occurs, as described below with reference to FIG. 5.

Figure 5:
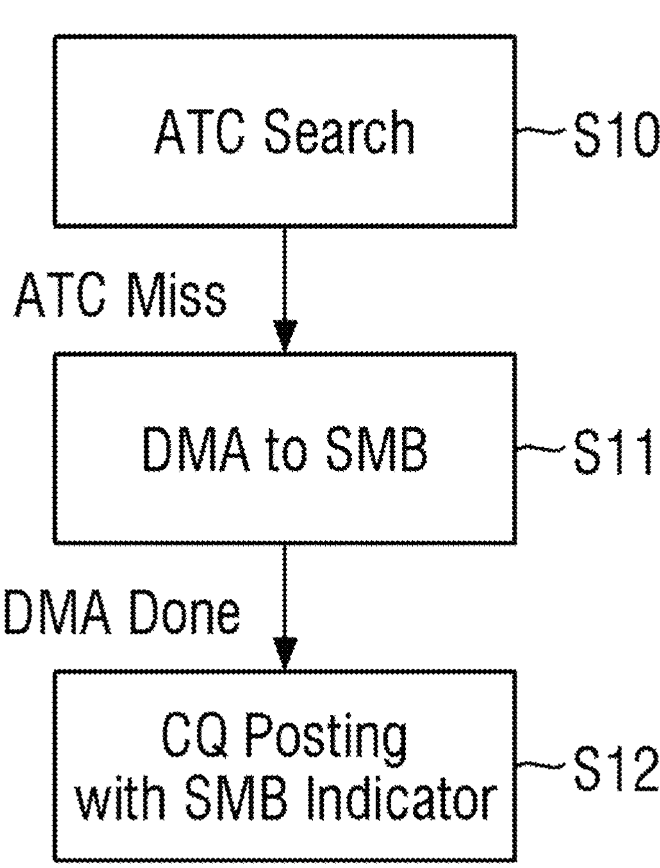
FIG. 5 is a flow chart illustrating an operating method of a storage system according to some embodiments.
Figure 6:
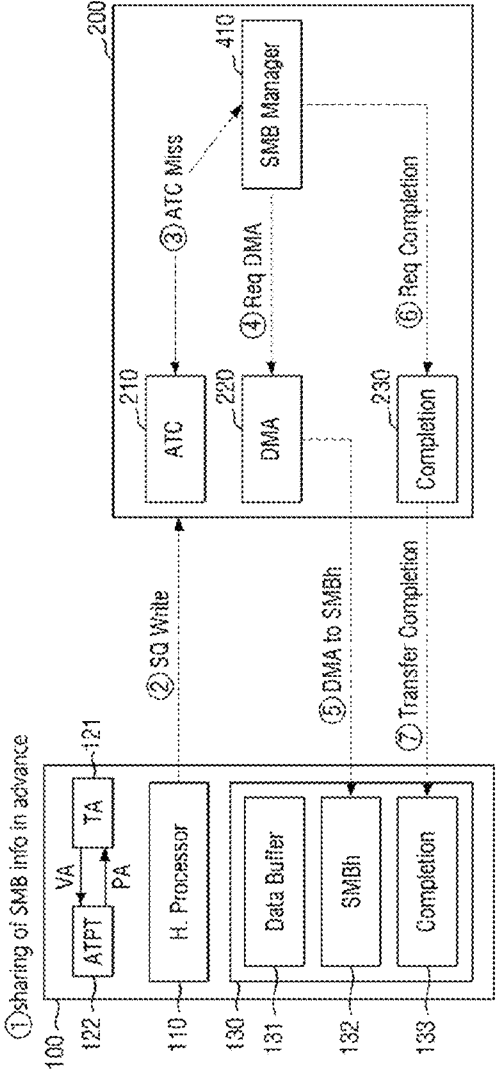
FIG. 6 is a block diagram illustrating the operating method of FIG. 5.

FIG. 5 is a flow chart illustrating an operating method of a storage system 1 according to some embodiments, and FIG. 6 is a block diagram illustrating the operating method of FIG. 5.

Referring to FIG. 5, the host 100 shares index information on the host SMB 132 in the storage device 2 in advance. The storage device 2 may store the shared index information in the device SMB 420, and the SMB manager 410 may use the stored index information during the operation. Afterwards, when receiving the command and the virtual address of the host 100, the storage device 2 checks whether there is a physical address mapped to the virtual address in the address translation cache 210 (S10). When there is no mapped physical address in the address translation cache 210 and thus a cache miss occurs (ATC Miss, Cache Miss), the storage device 2 performs direct memory access to the host SMB 132 together with the virtual address VA (S11). Subsequently, the storage device 2 transmits an exceptional completion queue, which includes the indicator of the location where the corresponding direct memory access is performed, to the host 100 (S12). That is, since the storage device 2 performs the direct memory access to the host 100 together with the virtual address without address translation in the address translation phase of S11 and performs the direct memory access at a physical address corresponding to the indicator in S12, the process performed from the cache miss (ATC Miss) to the cache update (ATC Fill) of FIG. 4 may be omitted, whereby latency according to the address translation operation may be reduced.

In more detail, referring to FIG. 6, the host 100 shares the index information on the host SMB 132 in the storage device 2 in advance (①). For example, the host SMB 132 and the device SMB 420 may store the same index information, respectively. The host processor 110 transmits a data write command (SQ Write) to the storage controller 200 (②). The storage controller 200 checks the virtual address included in the host command from the ATC 210. When a cache miss occurs because there is no physical address on the virtual address in the ATC 210 (③ ATC Miss), data related to the host command is stored in the device SMB 420.

The SMB manager 410 makes a request to the direct memory access manager 220 for memory access to the virtual address (④ Request DMA). The direct memory access manager 220 performs the direct memory access to the host SMB 132 of the host 100 together with the virtual address based on the request of the SMB manager 410 (⑤ DMA to SMBh). The SMB manager 410 performs a completion request by notifying the device completion manager 230 of the location of the host SMB 132 directly accessed by the direct memory access manager 220 (⑥ Request Completion). The device completion manager 230 transmits the completion queue, which includes the indicator, to the host completion manager 133 (⑦ Transfer Completion).

The host 100 checks the indicator received by the host completion manager 133, maps the same to the virtual address of the direct memory access performed in the host SMB 132 and notifies the translation agent 121 of the mapped result. The translation agent 121 updates address translation information by mapping a physical address having an index number corresponding to the indicator in the index information to the virtual address. For example, the updated address translation information may be stored in the ATPT 122, and then, may be transferred upon request of the translation agent 121.

Figure 7:
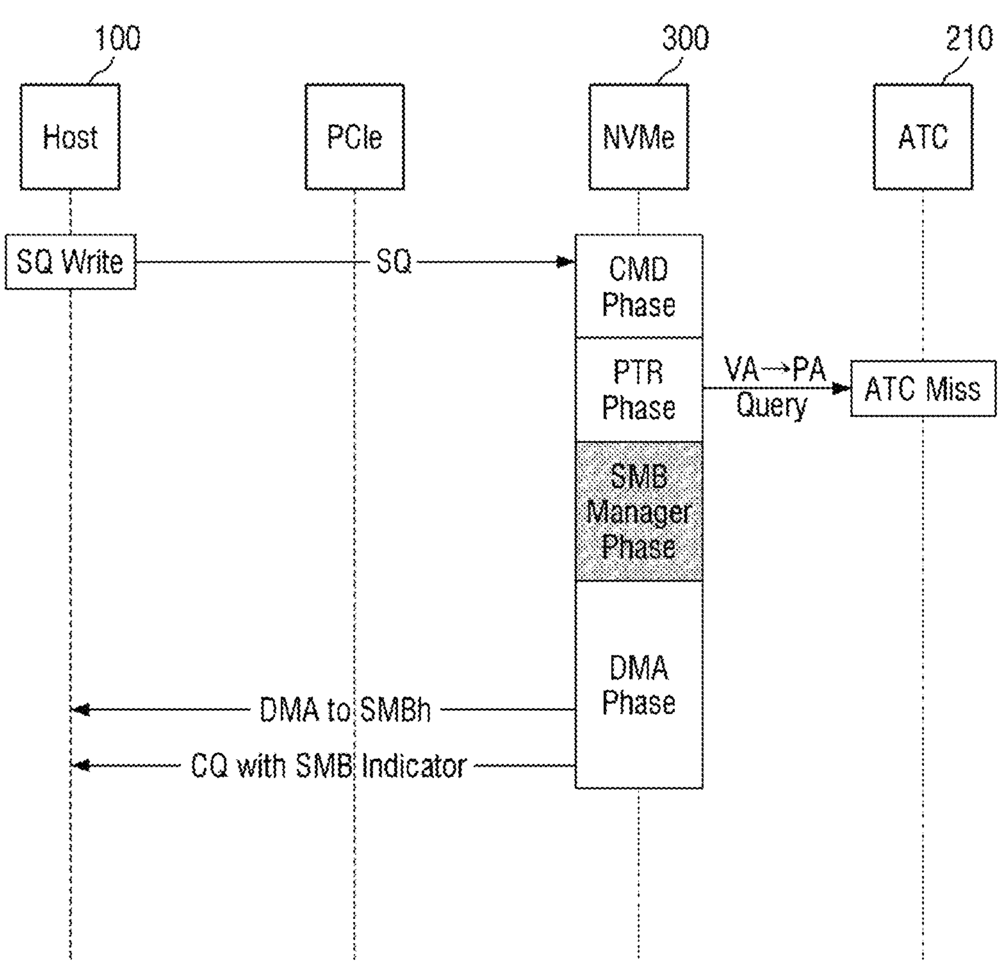
FIG. 7 is a flow chart illustrating an operating method of a storage system according to some embodiments.

FIG. 7 is a flow chart illustrating an operating method of a storage system according to some embodiments.

Referring to FIG. 7, the command phase of the storage system 1 may be the same as that of FIG. 4. However, when a cache miss occurs in the address translation phase (PTR phase) (ATC Miss), the storage controller 200 of the storage device 2 operates by itself and does not perform a communication operation with the host 100 in the SMB phase related to the operation in the storage memory buffer 400. The SMB manager phase may be, for example, the steps ② and ③ of FIG. 6.

The storage controller 200 then performs the direct memory access to the virtual address in the DMA phase (DMA to SMBh) and transmits a completion queue including an indicator (CQ with SMB Indicator).

As described above, since the storage system 1 according to some embodiments transmits indicators while immediately performing memory access without a physical address based on index information without performing a process of asking and responding address translation information to the host in the address translation phase and SMB phase, latency due to address translation may be reduced.

Figure 8:
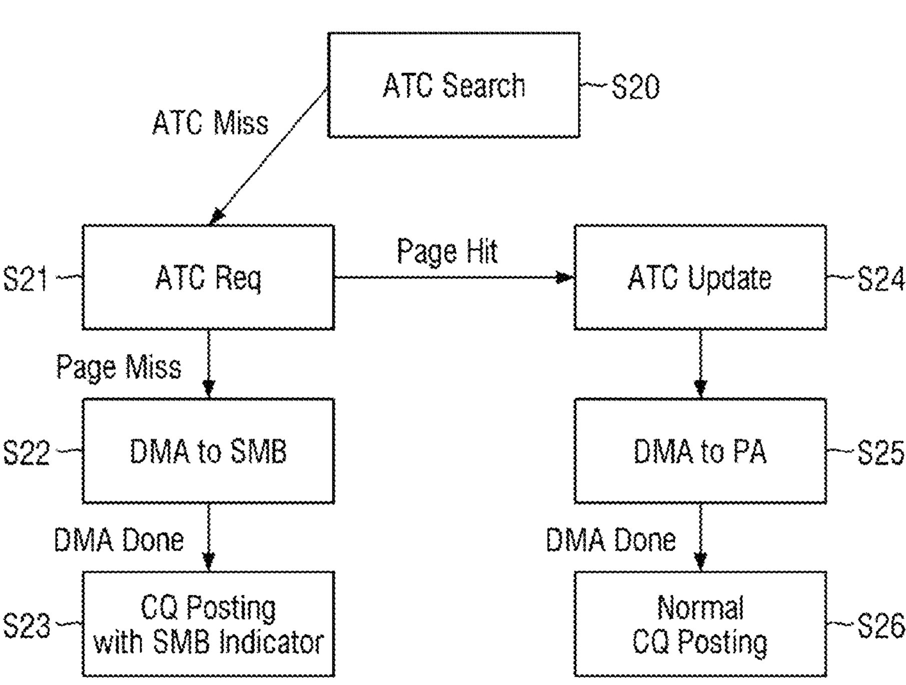
FIGS. 8 and 9 are flow charts illustrating an operating method of a storage system according to some embodiments.
Figure 9:
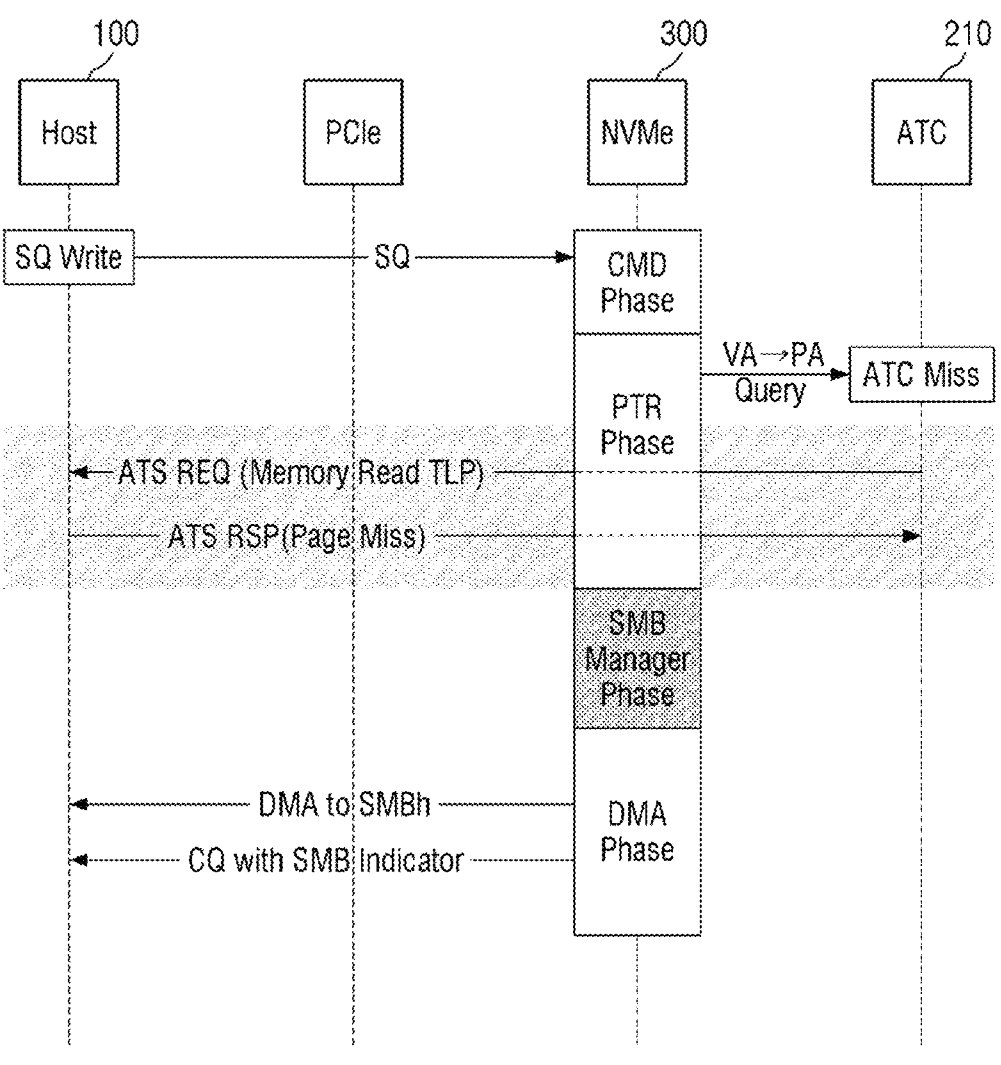

FIGS. 8 and 9 are flow charts illustrating an operating method of a storage system according to some embodiments.

Referring to FIGS. 8 and 9, the host 100 shares index information on the host SMB 132 in the storage device 2 in advance. Afterwards, when receiving the command and the virtual address of the host 100, the storage device 2 searches whether there is a physical address mapped to the virtual address in the address translation cache 210 (S20, VA-PA Query).

When a cache miss occurs in the address translation cache 210 due to no mapped physical address (ATC Miss, Cache Miss), the storage device 2 transmits an address translation service request to the translation agent 121 of the host (S21, ATS REQ). The host transmits an address translation service response (ATS RSP) corresponding to the address translation service request to the storage controller 200.

In the address translation service response, when there is no physical address mapped to the virtual address in the translation agent 121 (Page Miss), the SMB phase described with reference to FIG. 7 is performed. Then, the direct memory access to the host SMB 132 is performed together with the virtual address VA (S22, DMA to SMBh). Subsequently, the storage device 2 transmits a completion queue, which includes an indicator of a location where the corresponding direct memory access is performed for the completion queue, to the host 100 (S23, CQ with SMB Indicator).

When there is a physical address mapped to the virtual address in the translation agent 121 (Page Hit), an address translation service response including the mapped physical address is replied, and the address translation cache is updated in the address translation phase without the SMB phase (S24, DMA to PA). Afterwards, the storage controller 200 performs the direct memory access to the updated physical address (S25), and transmits a normal completion queue (Normal CQ) having no indicator to the host 100 (S26).

Unlike the embodiment of FIG. 7, in the embodiment of FIG. 9, the address translation service attempts to request the translation agent of the host at least once after the cache miss occurs, and the steps S22 and S23 corresponding to S11 and S12 of FIG. 5 are performed only when a page miss occurs in the translation agent. In this case, it is possible to reduce the latency of the request (Page Request) for allocating a page or the new address translation service response (ATS Rsp (Page Hit)), which has been described above with reference to FIG. 4.

Figure 10:
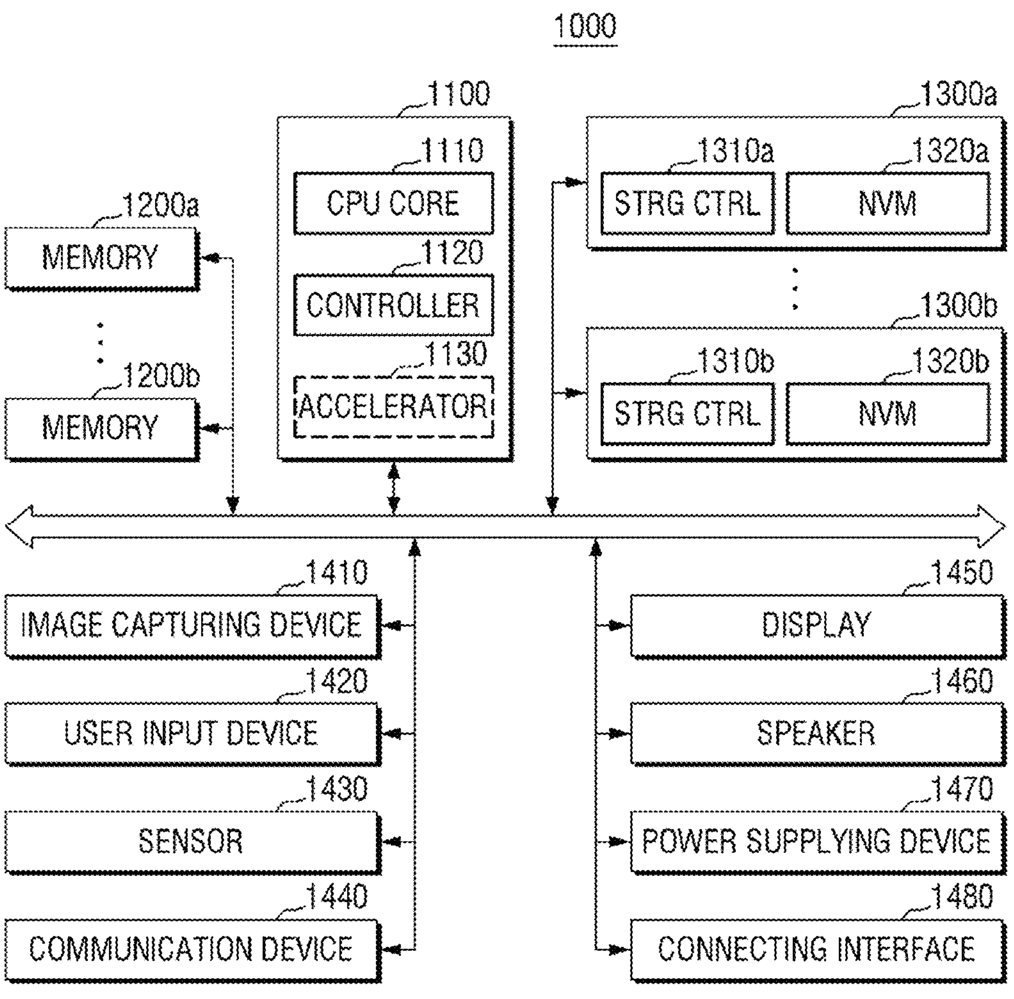
FIG. 10 is an exemplary block diagram illustrating a storage system to which a storage device according to some embodiments is applied.

FIG. 10 is an exemplary block diagram illustrating a storage system to which a storage device according to some embodiments is applied.

FIG. 10 illustrates a system 1000 to which a storage device according to one embodiment is applied. The system 1000 of FIG. 10 may be a mobile system such as a mobile phone, a smart phone, a tablet personal computer (PC), a wearable device, a healthcare device or an Internet of things (IOT) device. However, the system 1000 of FIG. 10 is not necessarily limited to the mobile system, and may be a personal computer, a laptop computer, a server, a media player or an automotive device such as navigator.

Referring to FIG. 10, the system 1000 may include a main processor 1100, memories 1200*a* and 1200*b* and storage devices 1300*a* and 1300*b*, and may further include one or more of an image capturing device 1410, a user input device 1420, a sensor 1430, a communication device 1440, a display 1450, a speaker 1460, a power supplying device 1470 and a connecting interface 1480.

Although not shown, the storage devices 1300*a* and 1300*b* may include the host interface described with reference to FIGS. 1 to 11.

The main processor 1100 may control the overall operation of the system 1000, more specifically the operation of other elements constituting the system 1000. The main processor 1100 may be implemented as a general purpose processor, a dedicated processor or an application processor.

The main processor 1100 may include one or more CPU cores 1110, and may further include a controller 1120 for controlling the memories 1200*a* and 1200*b* and/or the storage devices 1300*a* and 1300*b*. In accordance with the embodiment, the main processor 1100 may further include an accelerator 1130 that is a dedicated circuit for high-speed data computation such as an artificial intelligence (AI) data computation. The accelerator 1130 may include a graphics processing unit (GPU), a neural processing unit (NPU) and/or a data processing unit (DPU), and may be implemented as a separate chip physically independent of other elements of the main processor 1100.

The memories 1200*a* and 1200*b* may be used as main memory devices of the system 1000, and may include a volatile memory such as an SRAM and/or a DRAM but may also include a non-volatile memory such as a flash memory, a PRAM and/or an RRAM. The memories 1200*a* and 1200*b* may be implemented in the same package as the main processor 1100.

The storage devices 1300*a* and 1300*b* may serve as non-volatile storage devices for storing data regardless of whether a power source is supplied, and may have a storage capacity relatively greater than that of the memories 1200*a* and 1200*b*. In some embodiments, the storage devices 1300*a* and 1300*b* may include storage controllers 1310*a* and 1310*b* and non-volatile memories (NVM) 1320*a* and 1320*b* for storing data under the control of the storage controllers 1310*a* and 1310*b*. The non-volatile memories 1320*a* and 1320*b* may include a two-dimensional (2D) or three-dimensional (3D) vertical NAND (V-NAND) flash memory, but may include other types of non-volatile memories such as PRAM and/or RRAM.

The storage devices 1300*a* and 1300*b* may be included in the system 1000 in a physically separated state from the main processor 1100, or may be implemented in the same package as the main processor 1100. In addition, the storage devices 1300*a* and 1300*b* may be detachably coupled to other elements of the system 1000 through an interface, such as the connecting interface 1480, which will be described later, by having the same form as that of a solid state device (SSD) or a memory card. The storage devices 1300*a* and 1300*b* may be devices that comply with a standard protocol such as Universal Flash Storage (UFS), embedded multimedia card (eMMC) or non-volatile memory express (NVMe), but is not necessarily limited thereto.

The image capturing device 1410 may capture a still image or a video, and may be a camera, a camcorder and/or a webcam.

The user input device 1420 may receive various types of data input from a user of the system 1000, and may be a touch pad, a keypad, a keyboard, a mouse and/or a microphone.

The sensor 1430 may sense various types of physical quantities that may be acquired from the outside of the system 1000 and convert the sensed physical quantities into an electrical signal. The sensor 1430 may be a temperature sensor, a pressure sensor, an illuminance sensor, a position sensor, an acceleration sensor, a biosensor and/or a gyroscope sensor.

The communication device 1440 may perform transmission and reception of signals between other devices outside the system 1000 in accordance with various communication protocols. Such a communication device 1440 may be implemented by including an antenna, a transceiver and/or a modem.

The display 1450 and the speaker 1460 may serve as output devices that output visual information and auditory information to a user of the system 1000, respectively.

The power supplying device 1470 may appropriately convert power supplied from an external power source and/or a battery (not shown) embedded in the system 1000 to supply the power to each element of the system 1000.

The connecting interface 1480 may provide connection between the system 1000 and an external device connected to the system 1000 to exchange data with the system 1000. The connecting interface 1480 may be implemented in a variety of interface ways such as an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), Secure Digital (SD) card, Multi-Media Card (MMC), embedded multi-media card (eMMC), Universal Flash Storage (UFS), embedded Universal Flash Storage (eUFS) and Compact Flash (CF) card interface.

Figure 11:
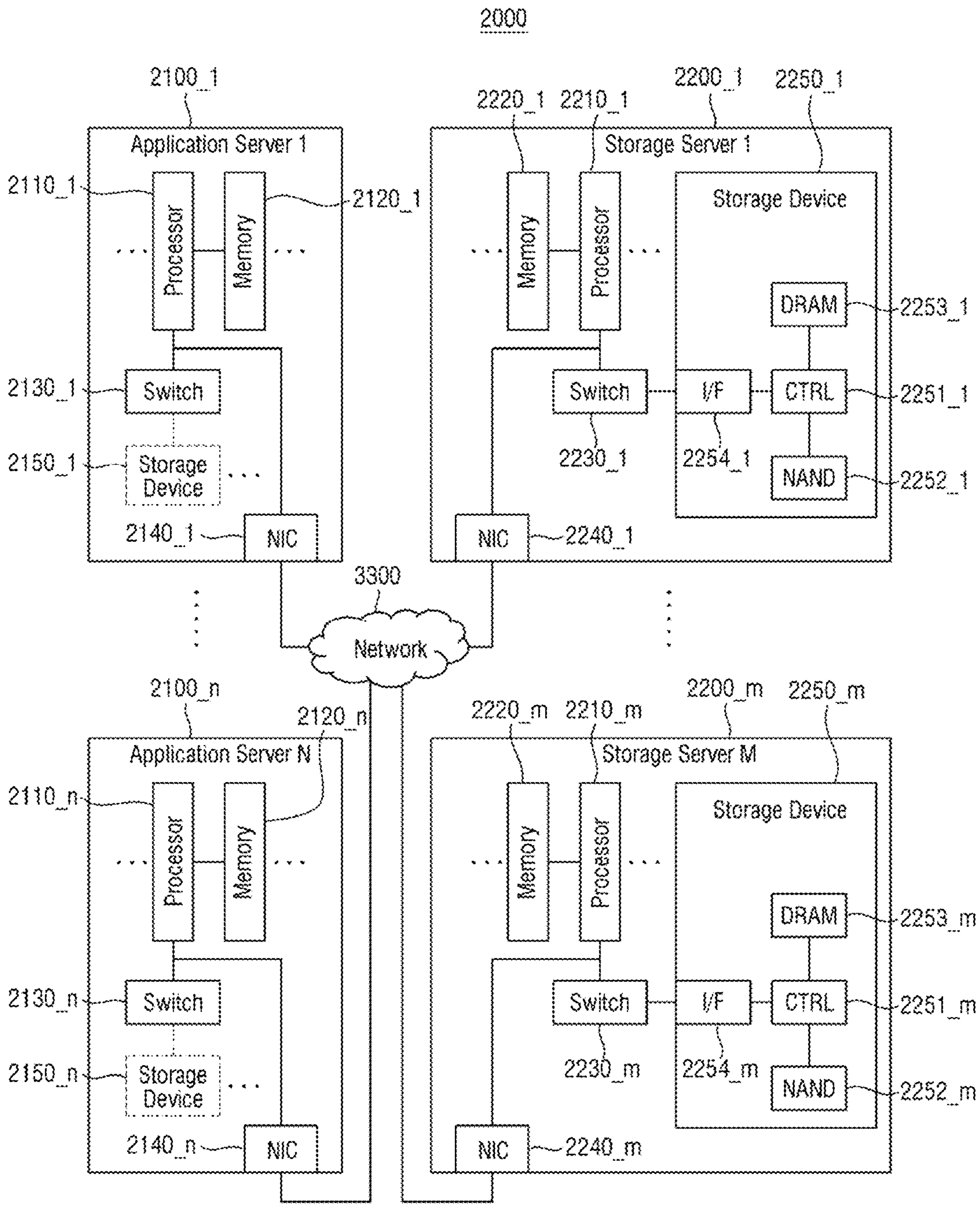
FIG. 11 is an exemplary block diagram illustrating a data center to which a storage device according to some embodiments is applied.

FIG. 11 is an exemplary block diagram illustrating a data center to which a storage device according to some embodiments is applied.

Referring to FIG. 11, a data center 2000 is a facility for providing a service by collecting various data, and may be referred to as a data storage center. The data center 2000 may be a system for a search engine or a database operation, and may be a computing system used in an enterprise such as a bank or a government agency. The data center 2000 may include application servers 2100_1 to **2100_*n* and storage servers 2200_1 to 2200_*m*. The number of application servers 2100_1 to 2100_*n* and the number of storage servers 2200_1 to 2200_*m* may be variously selected in accordance with embodiments, and the number of application servers 2100_1 to 2100_*n* and the number of storage servers 2200_1 to 2200_*m*** may be different from each other.

The application server **2100_*n* or the storage server 2200_*m* may include at least one of the processors 2110_*n* and 2210_*m* or the memories 2120_*n* and 2220_*m*. The storage server 2200_*m* will be described by way of example. The processor 2210_*m* may control the overall operation of the storage server 2200_*m*, and may access the memory 2220_*m* to execute command languages and/or data loaded into the memory 2220_*m*. The memory 2220_*m* may be a Double Data Rate Synchronous DRAM (DDR SDRAM), a High Bandwidth Memory (HBM), a Hybrid Memory Cube (HMC), a Dual In-line Memory Module (DIMM), an Optane DIMM and/or a Non-Volatile DIMM (NVMDIMM). In accordance with the embodiment, the number of processors 2210_*m* and the number of memories 2220_*m*, which are included in the storage server 2200_*m*, may be variously selected. In one embodiment, the processor 2210_*m* and the memory 2220_*m* may provide a processor-memory pair. In one embodiment, the number of processors 2210_*m* and the number of memories 2220_*m* may be different from each other. The processor 2210_*m* may include a single core processor or a multi-core processor. The description of the storage server 2200**_*m* may be similarly applied to the application server 2100_*n*. In accordance with the embodiment, the application server 2100_*n* may not include the storage device 2150_*n*. The storage server 2200_*m* may include at least one storage device 2250_*m*. The number of storage devices 2250_*m* included in the storage server 2200_*m* may be variously selected in accordance with the embodiments.

Although not shown, the storage device 2250_*m* may include the host interface described with reference to FIGS. 1 to 11.

The application servers 2100_1 to 2100_*n* and the storage servers 2200_1 to 2200_*m* may perform communication with each other through a network 3300. The network 3300 may be implemented using a Fiber Channel (FC) or Ethernet. In this case, the FC is a medium used for relatively high-speed data transmission, and may use an optical switch that provides high performance/high availability. In accordance with an access scheme of the network 3300, the storage servers 2200_1 to 2200_*m* may be provided as file storages, block storages or object storages.

In one embodiment, the network 3300 may be a storage-only network such as a storage area network (SAN). For example, the SAN may be an FC-SAN that uses an FC network and is implemented in accordance with an FC protocol (FCP). For another example, the SAN may be an IP-SAN that uses a TCP/IP network and is implemented in accordance with an SCSI over TCP/IP or Internet SCSI (iSCSI) protocol. In another embodiment, the network 3300 may be a general network such as a TCP/IP network. For example, the network 3300 may be implemented in accordance with protocols such as FC over Ethernet (FCoE), Network Attached Storage (NAS) and NVMe over Fabrics (NVMe-oF).

Hereinafter, the description will be based on the application server 2100_*n* and the storage server 2200_*m*. The description of the application server 2100_*n* may be applied to other application server 2100_*n*, and the description of the storage server 2200_*m* may be applied to other storage server 2200_*m*.

The application server 2100_*n* may store data requested by a user or a client in one of the storage servers 2200_1 to 2200_*m* through the network 3300. Also, the application server 2100 may acquire the data requested by the user or the client from one of the storage servers 2200_1 to 2200_*m* through the network 2300. For example, the application server 2100_*n* may be implemented as a web server or a database management system (DBMS).

The application server 2100_*n* may access the memory 2120_*n* or the storage device 2150_*n*, which is included in other application server 2100_*n*, through the network 3300. Alternatively, the application server 2100_*n* may access the memories 2220_1 to 2220_*m* or the storage devices 2250_1 to 2250_*m*, which are included in the storage servers 2200_1 to 2200_*m*, through the network 3300. Therefore, the application server 2100_*n* may perform various operations for the data stored in the application servers 2100_1 to 2100_*n* and/or the storage servers 2200_1 to 2200_*m*. For example, the application server 2100_*n* may execute command languages for moving or copying data between the application servers 2100_1 to 2100_*n* and/or the storage servers 2200_1 to 2200_*m*. In this case, the data may be moved from the storage devices 2250_1 to 2250_*m* of the storage servers 2200_1 to 2200_*m* to the memories 2220_1 to 2220_*m* of the storage servers 2200_1 to 2200_*m*, or may be directly moved to the memories 2120_1 to 2120_*n* of the application servers 2100_1 to 2100_*n*. The data moved through the network 3300 may be data encrypted for security or privacy.

The storage server 2200_*m* will be described by way of example. The interface 2254_*m* may provide physical connection of the processor 2210_*m* and a controller 2251_*m* and physical connection of a Network InterConnect (NIC) 2240_*m* and the controller 2251_*m*. For example, the interface 2254_*m* may be implemented in a Direct Attached Storage (DAS) scheme that directly connects the storage device 2250_*m* to a dedicated cable. Also, for example, the interface 2254_*m* may be implemented in the variety of interface ways such as an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), Secure Digital (SD) card, Multi-Media Card (MMC), embedded multi-media card (eMMC), Universal Flash Storage (UFS), embedded Universal Flash Storage (eUFS) and Compact Flash (CF) card interface.

The storage server 2200_*m* may further include a switch 2230_*m* and an NIC 2240_*m*. The switch 2230_*m* may selectively connect the processor 2210_*m* with the storage device 2250_*m* in accordance with the control of the processor 2210_*m*, or may selectively connect the NIC 2240_*m* with the storage device 2250_*m*.

In one embodiment, the NIC 2240_*m* may include a network interface card, a network adapter and the like. The NIC 2240_*m* may be connected to the network 3300 by a wired interface, a wireless interface, a Bluetooth interface, an optical interface and the like. The NIC 2240_*m* may include an internal memory, a Digital Signal Processor (DSP), a host bus interface and the like, and may be connected to the processor 2210_*m* and/or the switch 2230_*m* through the host bus interface. The host bus interface may be implemented as one of the above-described examples of the interface 2254_*m*. In one embodiment, the NIC 2240_*m* may be integrated with at least one of the processor 2210_*m*, the switch 2230_*m* or the storage device 2250_*m*.

In the storage servers 2200_1 to 2200_*m* or the application servers 2100_1 to 2100_*n*, the processor may transmit a command to the storage devices 2150_1 to 2150_*n* and 2250_1 to 2250_*m* or the memories 2120_1 to 2120_*n* and 2220_1 to 2220_*m* to program or read data. At this time, the data may be error-corrected data through an Error Correction Code (ECC) engine. The data may be data processed with Data Bus Inversion (DBI) or Data Masking (DM), and may include Cyclic Redundancy Code (CRC) information. The data may be data encrypted for security or privacy.

The storage devices 2150_1 to 2150_*n* and 2250_1 to 2250_*m* may transmit a control signal and command/address signals to NAND flash memory devices 2252_1 to 2252_*m* in response to a read command received from the processor. Therefore, when reading data from the NAND flash memory devices 2252_1 to 2252_*m*, a Read Enable (RE) signal may be input as a data output control signal to output the data to a DQ bus. A data strobe DQS may be generated using the RE signal. The command and the address signal may be latched into a page buffer in accordance with a rising edge or a falling edge of a write enable (WE) signal.

The controller 2251_*m* may generally control the operation of the storage device 2250. In one embodiment, the controller 2251_*m* may include a Static Random Access Memory (SRAM). The controller 2251_*m* may write data in the NAND flash 2252_*m* in response to a write command, or may read data from the NAND flash 2252_*m* in response to a read command. For example, the write command and/or the read command may be provided from the processor 2210_*m* in the storage server 2200_*m*, the processor 2210_*m* in the other storage server 2200_*m* or the processors 2110_1 and 2110_*n* in the application servers 2100_1 and 2100_*n*. The DRAM 2253_*m* may temporarily store (buffer) data to be written in the NAND flash 2252_*m* or data read from the NAND flash 2252_*m*. Also, the DRAM 2253_*m* may store metadata. In this case, the metadata is user data or data generated by the controller 2251_*m* to manage the NAND flash 2252_*m*. The storage device 2250_*m* may include a Secure Element (SE) for security or privacy.

Although the embodiments of the present disclosure have been described with reference to the accompanying drawings, it will be apparent to those skilled in the art that the present disclosure may be embodied in other specific forms without departing from technical spirits and essential characteristics of the present disclosure. Thus, the above embodiments are to be considered in all respects as illustrative and not restrictive.

What is claimed is:

1. A storage device comprising:

a storage controller comprising an address translation cache that translates a virtual address received with a command from a host into a physical address; and a non-volatile memory device, wherein the storage controller stores index information on a host specific memory buffer (SMB) in the host in advance, performs a direct memory access operation to the virtual address for the host SMB when a cache miss occurs in the address translation cache, and transmits an exceptional Completion Queue (CQ) including an indicator corresponding to a location where the direct memory access is performed to the host when the direct memory access is completely performed, wherein the storage controller comprises:

a SMB manager requesting memory access to the virtual address when the cache miss occurs;

a direct memory access manager performing an access operation for the host SMB together with the virtual address upon receiving the memory access request from the SMB manager;

a device specific memory buffer (SMB) mapping the virtual address to an indicator of the index information and storing the mapped virtual address upon the memory access request of the direct memory access manager; and a device completion manager transmitting the exceptional completion queue when the access operation of the direct memory access manager is completed.

2. The storage device of claim 1, wherein the index information comprises physical addresses of the host SMB, a block size, and an index number corresponding to the indicator.

3. The storage device of claim 1, wherein the host comprises a host processor and a host memory, and the host memory comprises a host completion manager receiving the exceptional completion queue from the storage controller in accordance with the direct memory access operation, and the host SMB storing the index information shared in advance in the storage controller and storing data accessed via direct memory access operation together with the virtual address.

4. The storage device of claim 3, wherein the host maps the virtual address received through the direct memory access operation to the physical address corresponding to the indicator included in the completion queue and stores the mapped virtual address as address translation information.

5. The storage device of claim 1, wherein the storage controller transmits an address translation service request to the host when a cache miss occurs in the address translation cache, updates the physical address allocated to the virtual address in the address translation cache when a physical address allocated in accordance with the address translation service request is received from the host, and performs the direct memory access operation to the host SMB of the allocated physical address.

6. A storage system comprising:

a host comprising a host memory storing index information on a physical address and a host processor outputting a command and a virtual address; and a storage device sharing the index information in advance and transmitting data according to the command to the host memory together with an indicator according to the index information in accordance with a direct memory access operation, and comprising:

an address translation cache translating the virtual address to the physical address of a host specific memory buffer (SMB);

a SMB manager requesting memory access to the virtual address when a cache miss occurs in the address translation cache;

a direct memory access manager performing an access operation for the host SMB together with the virtual address upon receiving the memory access request from the SMB manager;

a device specific memory buffer (SMB) storing the index information shared in advance; and a device completion manager transmitting a completion queue, which comprises the indicator, when the access operation of the direct memory access manager is completed.

7. The storage system of claim 6, wherein the host memory comprises:

a data buffer storing operation data;

a host completion manager receiving a completion queue, which comprises the indicator, from the storage device in accordance with the direct memory access operation; and the host SMB storing the index information shared in advance in the storage device.

8. The storage system of claim 7, wherein the host further comprises a translation agent mapping the virtual address for the direct memory access operation to the physical address corresponding to the indicator to update the mapped virtual address with address translation information.

9. The storage system of claim 7, wherein the device completion manager allocates any one indicator for a location in the host SMB to the virtual address based on the stored index information so that the indicator is included in the completion queue.

10. The storage system of claim 7, wherein the address translation cache requests an address translation service of a translation agent when the cache miss occurs due to no physical address corresponding to the virtual address, and the SMB manager requests the direct memory access manager to perform the memory access when a newly allocated physical address is not received from the translation agent.

11. The storage system of claim 10, wherein the address translation cache maps the physical address to the virtual address and updates the mapped physical address when the newly allocated physical address is received from the translation agent, and the direct memory access manager performs direct memory access to the updated physical address of the host SMB.

12. The storage system of claim 11, wherein the device completion manager transmits a normal completion queue to a host completion manager after performing the direct memory access to the updated physical address of the host SMB.

13. The storage system of claim 7, wherein the index information comprises physical addresses of the host SMB, a block size, and an index number corresponding to the indicator.

14. An operating method of a storage device, the operating method comprising:

performing direct memory access to a host together with a virtual address when a cache miss for the virtual address occurs in an address translation cache;

requesting memory access to the virtual address when the cache miss occurs;

performing an access operation for a host specific memory buffer (SMB) together with the virtual address upon receiving the memory access request;

mapping the virtual address to an indicator of index information stored on the host SMB and storing the mapped virtual address upon the memory access request; and outputting a completion queue, which comprises an indicator corresponding to the virtual address, to the host, when the access operation for the host SMB is completed.

15. The operating method of claim 14, wherein the storage device receives and stores index information on a host memory from the host in advance.

16. The operating method of claim 15, wherein the storage device selects any one indicator for a location in the host memory based on the index information with respect to the cache missed virtual address, and outputs the selected indicator to the host by including the selected indicator in the completion queue.

17. The operating method of claim 16, wherein the host maps a physical address corresponding to the indicator, received from the storage device, of the index information to the virtual address, and performs the direct memory access to a location of the mapped physical address in the host memory.

18. The operating method of claim 17, wherein the host transmits the physical address mapped to the virtual address to the address translation cache through a translation agent.

* * * * *